United States Patent [19]

Masom

[11] 4,440,022
[45] Apr. 3, 1984

[54] LIQUID-LEVEL DETECTION

[75] Inventor: Ronald A. Masom, Bitterne, England

[73] Assignee: Smiths Industries Public Limited Company, London, England

[21] Appl. No.: 419,103

[22] Filed: Sep. 16, 1982

[30] Foreign Application Priority Data

Oct. 14, 1981 [GB] United Kingdom ............... 8131009

[51] Int. Cl.³ .......................................... G01F 23/08
[52] U.S. Cl. ................................... 73/293; 250/577; 340/619
[58] Field of Search .................. 73/293; 356/128, 136, 356/135; 250/577; 340/619; 374/17, 18, 19, 28

[56] References Cited

U.S. PATENT DOCUMENTS

| 3,808,887 | 5/1974 | Buttriss | 73/293 |
| 4,297,588 | 10/1981 | Hastbacka | 73/293 |
| 4,354,180 | 10/1982 | Harding | 73/293 |

FOREIGN PATENT DOCUMENTS

| 677194 | 8/1952 | United Kingdom . |
| 1550073 | 8/1979 | United Kingdom . |
| 2016141A | 9/1979 | United Kingdom . |
| 1561667 | 2/1980 | United Kingdom . |
| 2036326A | 6/1980 | United Kingdom . |
| 514133 | 10/1939 | United Kingdom . |

Primary Examiner—Charles Frankfort
Assistant Examiner—David R. Schuster
Attorney, Agent, or Firm—Pollock, Vande Sande & Priddy

[57] ABSTRACT

An oil-level detector is mounted on the outside face of a glass window in the wall of an oil tank. The detector has two fibre-optic cables which extend within a cavity between the detector and the window. The ends of the cables are mounted one above the other, one cable transmitting a beam of light at an angle $\alpha$ of 60° to the window, through an oil in the cavity which has a refractive index substantially equal to that of the window glass. The angle $\alpha$ is greater than the critical angle of glass with air, and less than the critical angle of glass with the oil in the tank. When the window is covered by oil in the tank the light is refracted into the tank. When the oil level falls below the window, the light is reflected to the other cable which is connected to a control unit. The control unit gives a warning a predetermined time after the level has fallen.

8 Claims, 4 Drawing Figures

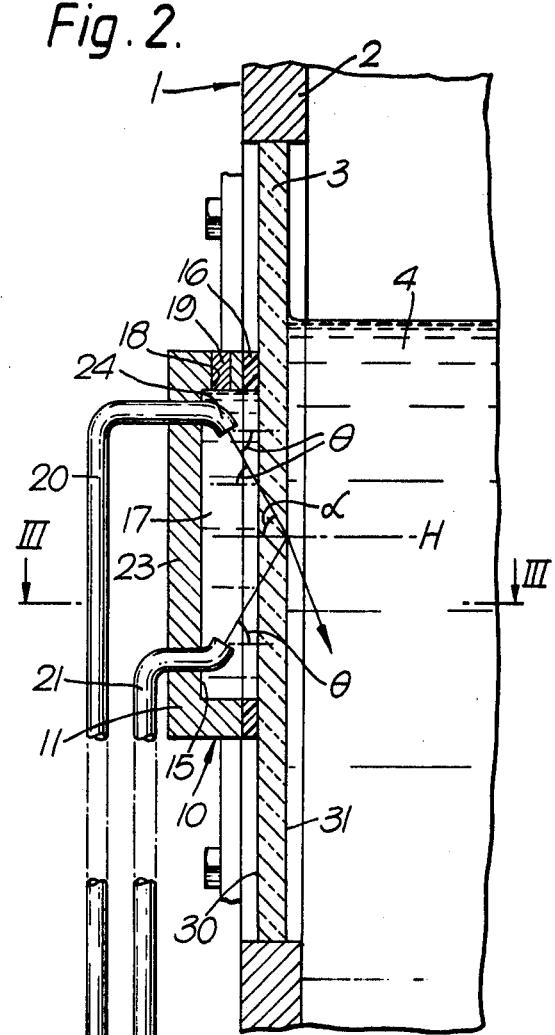
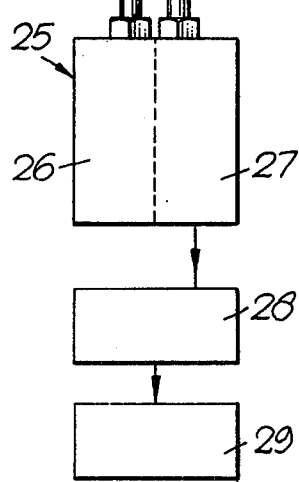
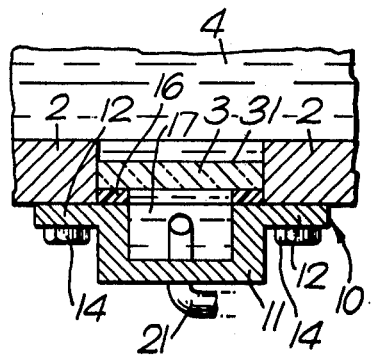
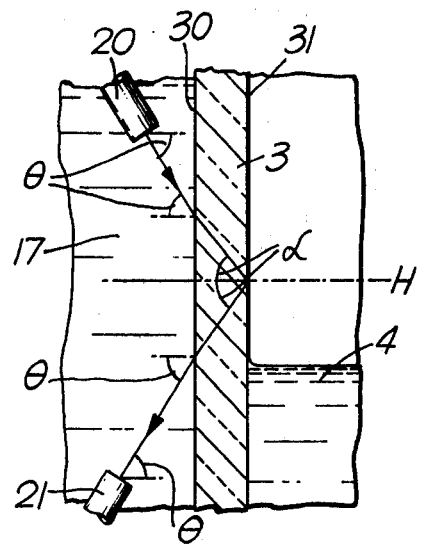

LIQUID-LEVEL DETECTION

BACKGROUND OF THE INVENTION

This invention relates to liquid-level detectors and to reservoirs including such detectors.

Liquid-level detectors are required in many applications, such as, in engines to provide a warning indication when the quantity of oil or fuel reaches a low level. Detectors of many different constructions have been used in the past but these have various disadvantages and limitations. For example, with previous arrangements it has usually been necessary to mount the detector within the liquid container, thereby presenting problems in making a seal where the detector cable emerges from the container. Installation, checking and maintenance of such detectors is also difficult and, furthermore, they can be damaged by contact with the liquid or, if electrically operated, present a hazard with flammable liquids. For this reason, it is desirable to mount the detector externally of the container, especially where the detector is to be added to existing containers. One example of previous detectors of this kind relies on the interruption or completion of a beam of light directed across the container at the height at which the warning indication is to be provided. These detectors, however, require two windows on opposite sides of the container through which the light emitter and sensor respectively can view one another. Many existing containers have only one window, for visual inspection of liquid level, making this method of detection unsuitable. Problems also arise, especially where the detector is to be used with an engine, such as a gas-turbine engine, in providing and mounting a detector to withstand the adverse environment—high vibration and temperature changes.

BRIEF SUMMARY OF THE INVENTION

It is an object of the present invention to provide a detector that can be used substantially to alleviate such problems.

According to one aspect of the present invention there is provided a liquid-level detector for mounting externally of a liquid reservoir having a window of transparent material in its wall, the detector including: a mounting assembly defining a cavity which is to be sealed by said window and which is to receive a transparent liquid or gel having a refractive index substantially the same as that of said window; means for transmitting a beam of light through said cavity towards said window at an angle greater than the critical angle of said transparent material with air, and less than the critical angle of said transparent material with the liquid in said reservoir, such that said beam of light is refracted into said reservoir when the liquid in the reservoir covers the location at which said beam is incident on the internal face of said window, and is reflected by said internal face when said location is uncovered by the liquid in said reservoir; and means for receiving said beam of light when it is reflected from the internal face of said window and for providing an output which changes as the level of liquid in said reservoir moves over said location.

In this way only one window is required in the container, and an effective optical coupling of the transmitting and receiving means with the window can be provided.

The means for transmitting and receiving the beam of light may include fibre-optic cable means one end of which extends within said cavity.

According to another aspect of the present invention there is provided a liquid reservoir having a window of transparent material in its wall, and a liquid-level detector mounted externally of said window, the detector including: a mounting assembly defining a cavity which is sealed by said window and which contains a transparent liquid or gel having a refractive index substantially the same as that of said window; means for transmitting a beam of light through said cavity towards said window at an angle greater than the critical angle of said transparent material with air and less that the critical angle of said transparent material with the liquid in said reservoir, such that said beam of light is refracted into said reservoir when the liquid in the reservoir covers the location at which said beam is incident on the internal face of said window, and is reflected by said internal face when said location is uncovered by the liquid in said reservoir; and means for receiving said beam of light when it is reflected from the internal face of said window and for providing an output which changes as the level of liquid in said reservoir moves over said location.

The cavity may contain an oil.

A detector, and detecting system for the oil tank of a gas-turbine engine in accordance with the present invention, will now be described, by way of example, with reference to the accompanying drawings.

BRIEF DESCRIPTION OF THE DRAWINGS

FIG. 2 is a sectional elevation of the detector along the line II—II;

FIG. 3 is a section view from above of the detector along the line III—III; and

FIG. 4 shows a part of FIG. 2 but with a lower oil level.

DETAILED DESCRIPTION

Figure 1:
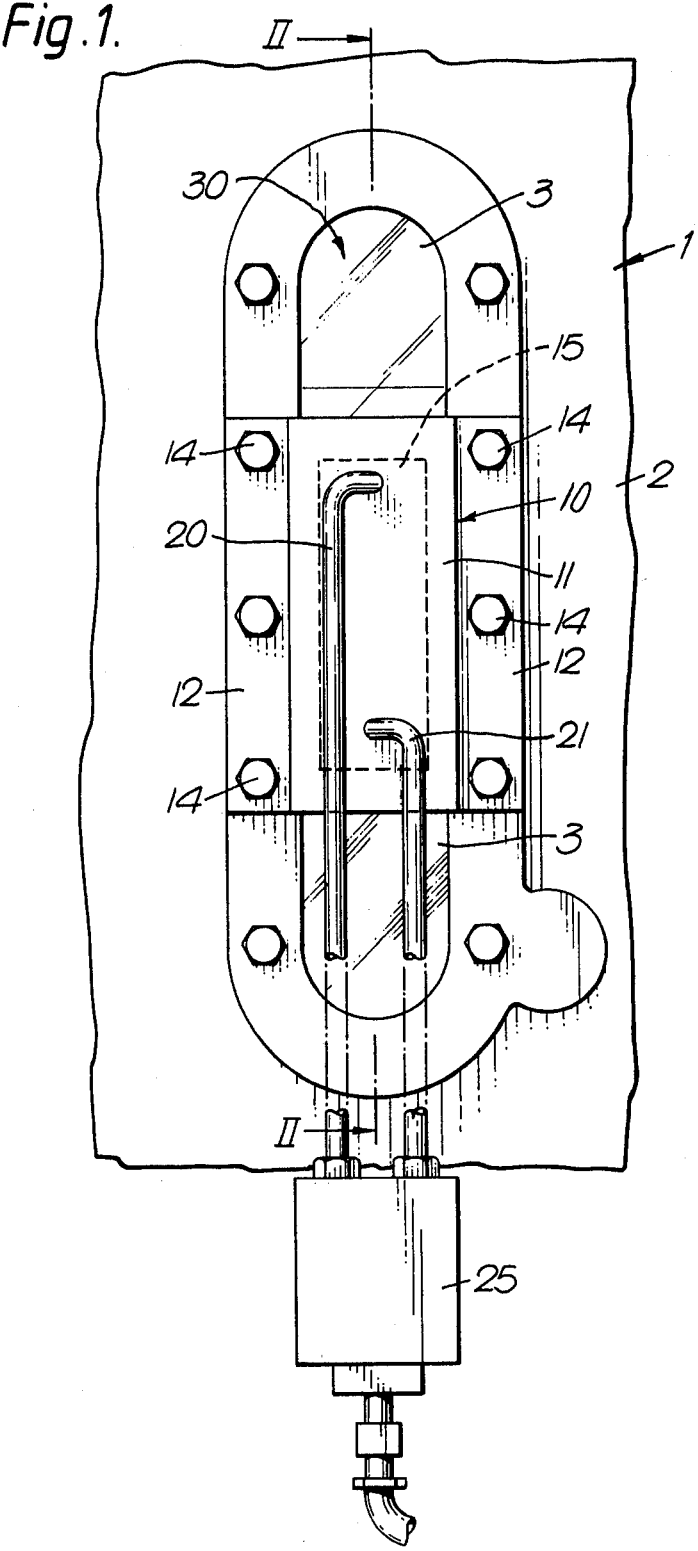
FIG. 1 is a side elevation of a part of the tank showing the detector.

With reference to FIGS. 1 to 3, the oil tank 1 of a gas-turbine engine (the rest of which is not shown) has a metal wall 2 within which there is provided a transparent sight-glass or window 3. The window 3 is arranged vertically to enable the level of oil 4 within the tank 1 to be viewed. The detector 10 is mounted directly on the window 3 and requires no additional entry to the tank 1.

The detector 10 has a metal mounting assembly 11 which is of generally rectangular shape and which has two side flanges 12. The flanges 12 each have three holes through which project the bolts 14 by which the window 3 is sealed in the tank wall 2. Centrally of the mounting assembly 1 there is a rectangular cavity 15 which is open on the rear face of the assembly, abutting the window 3. Between the mounting assembly 11 and the window 3 there is sandwiched an elastomeric gland 16 which is compressed when the bolts 14 are tightened, so as to form an effective seal between the detector and the window. The cavity 15 is filled with an optically-transparent oil 17 (although any other suitable liquid or gel could be used) the refractive index of which is similar to that of the glass from which the window 3 is made. The mounting assembly 11 has, at its upper end, a small passage 18 into the cavity 15 for the purpose of introducing the oil 17, the passage being sealed after use, by a plug 19.

Two fibre-optic cables 20 and 21 project through the front face 23 of the assembly 11 into the cavity 15. The forward end 24 of the upper cable 20 is inclined downwardly at an angle $\theta$ of about 60°. The end 24 of the cable 20 is positioned such that it transmits a beam of light which is incident on the internal face 31 of the window 3 at the height H, being that at which a warning indication is to be given. The lower cable 21 enters the lower part of the assembly 11 and is inclined upwardly at the same angle $\theta$, being positioned to receive the beam of light where it is reflected from the window 3.

The cables 20 and 21 extend rearwardly of the detector 10 to a suitable remote location where they are terminated at a sensor head 25. The sensor head 25 includes a light source 26 arranged to transmit light along cable 20, and a light detector 27 arranged to respond to light received by the other cable 21. Electrical signals from the detector 27 are supplied to a control unit 28 which is arranged to provide a warning signal to an alarm 29 which may be of audible or visual form. The control unit 28 provides the alarm signal when the level of illumination received by the cable 21 rises above a predetermined value for a predetermined time.

The oil 4 in the tank 1 is normally above the height H at which the beam of light from the cable 20 is incident on the window 3, as shown in FIG. 2. The beam of light therefore passes through the oil 17 in the cavity 15, is refracted slightly at the interface with the outer surface 30 of the window 3 and then passes through the window 3 to its inner surface 31 where it is incident at an angle $\alpha$. The critical angle $C_o$ for the glass/oil interface at the inner surface 31 is given by the expression:

$$\sin C_o = \mu_o / \mu_g$$

where $\mu_o$ is the refractive index of oil and $\mu_g$ is the refractive index of glass.

Typically, $\mu_o$ would be about 1.45 and $\mu_g$ about 1.5, making $C_o$ about 75°. Because the refractive index of the oil 17 in the cavity 15 is substantially the same as that of the glass of the window 3, the refraction of the light beam will only be small and $\alpha$ will be substantially the same as $\theta$, namely 60°.

Since $\alpha$ (60°) is less than the critical angle $C_o$, the beam of light passes through the window 3 into the oil 4 within the tank 1. When, however, the level of oil 4 in the tank 1 falls below H, as shown in FIG. 4, the situation changes since the beam of light incident on the inner surface 31 of the window is now at a glass/air interface. In this case the critical angle $C_g$ is about 42° and, since $\alpha$ (60°) is greater than the critical angle, the beam of light undergoes total internal reflection. This causes the light to illuminate the end of the receiving fibre-optic cable 21 thereby producing an output signal to the control unit 28. If the oil level remains low for more than a predetermined time the control unit 28 activates the alarm 29. The time delay prevents an alarm being given for momentary changes in oil level caused by slopping of the oil 4 within the tank 1 due to motion of the engine.

The oil 17 within the cavity 15 is necessary for optically coupling the fibre-optic cables 20 and 21 with the window 3 and for preventing the beam of light produced by the transmitting cable being reflected from the front surface 30 of the window. By using a fluid 17 in this way it is ensured that no air pockets are formed on the outer surface of the window. It is, moreover, relatively easy to check that the fibre-optic cables 20 and 21 are effectively coupled with the window 3 by visual inspection of the oil level in the mounting assembly 11, such as by removing the plug 19. In this respect, the mounting assembly 11 may itself be made of a transparent material such as plastic or glass which also has the advantage of enabling the level of oil 4 in the tank 2 to be seen more readily. The detector 10 can also be readily removed and replaced for maintenance without the risk of damaging the window 3 of the tank 2.

It will be appreciated that the light directed onto the window need not be of visible wavelengths but could be ultra-violet or infra-red and may be pulsed or continous. By this means provision can be made to reduce the effect of stray light. It is not essential to use fibre-optic cables to transmit the light, other light guides could instead be used. Alternatively, the light source and light detector could be mounted directly with the assembly 11 and electrical outputs supplied to a remotely-mounted alarm or control unit.

Similar arrangements can be provided for sensing when liquid level rises above a predetermined height. In such an arrangement the control unit associated with the detector would be responsive to a fall in the level of reflected light when the liquid causes the light beam to be refracted into the container. A plurality of similar detectors could be mounted one above the other, so that, by determining which are covered by liquid and which uncovered, an indication of the level of liquid could be provided.

It will be appreciated that lenses or other means could be used to focus light from the light transmitter to the window, and from the window onto the light receiver, whether the transmitter and receiver are the ends of fibre-optic cables, or the light source and detector themselves.

I claim:

1. A liquid reservoir of the kind having a wall, a window of transparent material mounted in said wall, and a liquid-level detector mounted on said reservoir, the improvement wherein the detector comprises: a mounting assembly shaped to define a cavity facing said window; means sealing said mounting assembly with said window; a transparent liquid or gel in said cavity, said liquid or gel having a refractive index substantially the same as that of said window; transmitting means for transmitting a beam of light through said cavity towards said window at an angle greater than the critical angle of said transparent material with air and less than the critical angle of said transparent material with the liquid in said reservoir, such that said beam of light is refracted into said reservoir when the liquid in the reservoir covers the location at which said beam is incident on the internal face of said window, and is reflected by said internal face when said location is uncovered by the liquid in said reservoir; and receiving means for receiving said beam of light when it is reflected from the internal face of said window, said receiving means providing an output which changes as the level of liquid in said reservoir moves over said location.

2. A liquid reservoir according to claim 1, wherein said transmitting means includes fibre-optic cable means.

3. A liquid reservoir according to claim 1, wherein said receiving means includes fibre-optic cable means.

4. A liquid reservoir according to claim 1, wherein said mounting assembly mounts said transmitting means and said receiving means vertically above one another.

5. A liquid reservoir according to claim 1, wherein said angle is substantially equal to 60° from the normal to said window.

6. A liquid reservoir according to claim 1, including a control unit, and means connecting said receiving means to said control unit, said control unit providing a signal a predetermined time after the liquid in said reservoir moves over said location.

7. A liquid reservoir according to claim 1, wherein said cavity contains an oil.

8. A liquid reservoir having a wall, a window of transparent material in said wall, a liquid-level detector, and means mounting said detector externally of said window, wherein said detector comprises: a mounting assembly shaped to define a cavity facing said window; means sealing said mounting assembly with said window; a transparent liquid or gel filling said cavity, said liquid or gel having a refractive index substantially the same as that of said window; a light source; first fibre-optic cable means having one end extending in said cavity and the other end connected to said light source; a light sensor; second fibre-optic cable means having one end extending in said cavity and the other end connected to said light sensor, the said one ends of said first and second fibre-optic cable means being angled such that light is transmitted from said first cable means through said cavity towards said window at an angle greater than the critical angle of said transparent material with air and less than the critical angle of said transparent material with the liquid in said reservoir and such that light is reflected by said window to the end of said second fibre-optic cable means only when the level of liquid in said reservoir is below the location at which light from the first fibre-optic cable means is incident on said window; a control unit; and means connecting said control unit to said light sensor such that said control unit provides an output signal in response to movement of the liquid in said reservoir over said location.

* * * * *